(12) United States Patent
Holmes

(10) Patent No.: US 6,540,631 B2
(45) Date of Patent: Apr. 1, 2003

(54) ELECTRICALLY VARIABLE TRANSMISSION WITH VARIABLE INPUT POWER SPLIT AND INDEPENDENT SHIFTING

(75) Inventor: Alan G. Holmes, Fishers, IN (US)

(73) Assignee: General Motors Corporation, Detroit, MI (US)

(*) Notice: Subject to any disclaimer, the term of this patent is extended or adjusted under 35 U.S.C. 154(b) by 0 days.

(21) Appl. No.: 09/928,716

(22) Filed: Aug. 13, 2001

(65) Prior Publication Data

US 2003/0032515 A1 Feb. 13, 2003

(51) Int. Cl.⁷ .................................. F16H 3/72
(52) U.S. Cl. ........................................... 475/5
(58) Field of Search ............................. 475/2, 5

(56) References Cited

U.S. PATENT DOCUMENTS

| | | | |
|---|---|---|---|
| 3,566,717 A | | 3/1971 | Berman et al. ............ 74/859 |
| 5,558,595 A | | 9/1996 | Schmidt et al. ............ 477/3 |
| 5,603,671 A | * | 2/1997 | Schmidt .................... 475/5 |
| 5,643,119 A | | 7/1997 | Yamaguchi et al. ....... 475/5 |
| 5,931,757 A | | 8/1999 | Schmidt .................... 475/2 |
| 5,935,035 A | * | 8/1999 | Schmidt .................... 475/5 |
| 6,022,287 A | * | 2/2000 | Klemen et al. ............ 475/5 |
| 6,090,005 A | * | 7/2000 | Schmidt et al. ............ 475/5 |
| 6,358,173 B1 | * | 3/2002 | Klemen et al. ............ 475/5 |

* cited by examiner

Primary Examiner—Dirk Wright
(74) Attorney, Agent, or Firm—Leslie C. Hodges

(57) ABSTRACT

An improved electrically variable transmission, especially useful in a hybrid electric vehicle, includes a variable input power split and independent shifting of the gear ratios of the mechanical and electrical power paths through the transmission. A first electric machine varies the ratio of the mechanical power path, and a second electric machine defining the electrical power path is mechanically connected to the output at two or more ratios and electrically connected to the first electric machine and optionally to an electric storage device. The mechanical connection of the second electric machine can be reconfigured without disturbing the output whenever the power flow through the electrical power path is zero. The second electric machine and electric storage device can sustain the output when the mechanical power path is reconfigured. Reconfiguration of the mechanical power path and the mechanical connection of the second electric machine are achieved with automated manual transmission gearing, and independent reconfiguration of the mechanical power path and the mechanical connection multiplies the number of overall operating modes for improved efficiency at a low cost.

8 Claims, 5 Drawing Sheets

ELECTRICALLY VARIABLE TRANSMISSION WITH VARIABLE INPUT POWER SPLIT AND INDEPENDENT SHIFTING

TECHNICAL FIELD

This invention relates to an electrically variable transmission for a motor vehicle powertrain, and more particularly to an electrically variable transmission having variable ratio input split differential gearing and independently shifted power paths through the transmission.

BACKGROUND OF THE INVENTION

An electrically variable transmission (EVT) utilizes one or more electric machines (which may be operated as motors or generators) and a differential gearing arrangement to provide a continuously variable ratio drive between input and output. An EVT is particularly useful in hybrid electric vehicle powertrains including an engine that is directly coupled to the transmission input and also including an electrical storage battery used to supply power for propulsion and to recover energy from braking. An EVT is also particularly useful with an engine that is designed for constant speed operation.

Such a powertrain is shown and described in the U.S. Pat. No. 5,931,757 to Schmidt, issued on Aug. 3, 1999, and assigned to the assignee of the present invention. In Schmidt, the electric machines are conveniently arranged on a common axis with a compound planetary differential gearset, and operation over a wide output speed range without requiring undesirably high electric machine speeds is achieved by using multiple friction clutches to reconfigure or shift the operating mode of the gearset at a mid-range output speed. Increasing the number of operating modes will improve the powertrain efficiency and minimize the capacity, cost and weight of the electric machines. However, the number of operating modes in prior art EVT configurations have been minimized due to considerations of cost, gearing complexity, size, weight and so on.

To minimize clutch energy and output torque disturbances during shifting, the clutches in the Schmitt configuration are operated synchronously — that is, with substantially zero relative speed between the two sides of each clutching mechanism. Another way to minimize clutch energy is to interrupt the power flow through the transmission, as has been very well known in manual automotive transmissions, and in the automated manual transmission (AMT). To avoid interrupting the power flow, an AMT can be configured with multiple power paths, where one power path remains active while the other shifts; however, such configurations typically require duplication of many parts.

Accordingly, what is desired is an efficient EVT configuration with multiple power paths and multiple operating modes, and that is smaller and lower in cost and complexity than presently known EVT configurations.

SUMMARY OF THE INVENTION

The present invention is directed to an improved EVT configuration including a mechanical power path from input to output through input split differential gearing, a first electric machine that regulates the ratio between input and output, a partly electrical power path to the output, and a second electric machine that functions as an electric power balancer. Both power paths are independently reconfigurable to provide multiple operating modes to reduce the torque and speed requirements of the second electric machine, and to prevent power interruption during shifting. For example, during reconfiguration of the mechanical power path, an external electrical source such as a storage battery can supply torque to the output through the second electric machine.

Preferably, reconfiguration of the electrical power path is performed when the torque produced by the second electric machine is substantially zero. If electrical power is neither drawn from nor supplied to the EVT, the second machine will produce zero torque when the speed of the first electric machine is substantially zero. If electrical power is drawn from or supplied by a storage battery or other external source, the second electric machine will produce zero torque when the power required by the first electric machine is equal to the power that can be supplied by the external source.

Preferably, reconfiguration of the power paths is achieved with clutches having sliding splines or other compact means typically found in the manual transmission and in the AMT. In the illustrated embodiment, a system of overlapping sliding splines is used to select all of the configurations of differential gearing available from a single planetary gearset.

In a preferred implementation, the EVT of the present invention includes first and second independently reconfigurable multiple-mode gearsets serially coupled by a connecting shaft, and features automated manual transmission gearing for reduced cost, size and complexity. The first gearset differentially couples an input and the first electric machine to the connecting shaft, and the second gearset couples the connecting shaft to an output. The second electric machine is coupled to the second gearset with multiple-mode AMT gearing to provide power balancing, and independently reconfiguring the gearsets and the coupling of the second machine multiplies the number of overall transmission operating modes to provide improved efficiency without significantly increasing the cost, size and complexity of the transmission, and without sacrificing the advantages of known EVT configurations.

DESCRIPTION OF THE PREFERRED EMBODIMENT

Figure 1A:
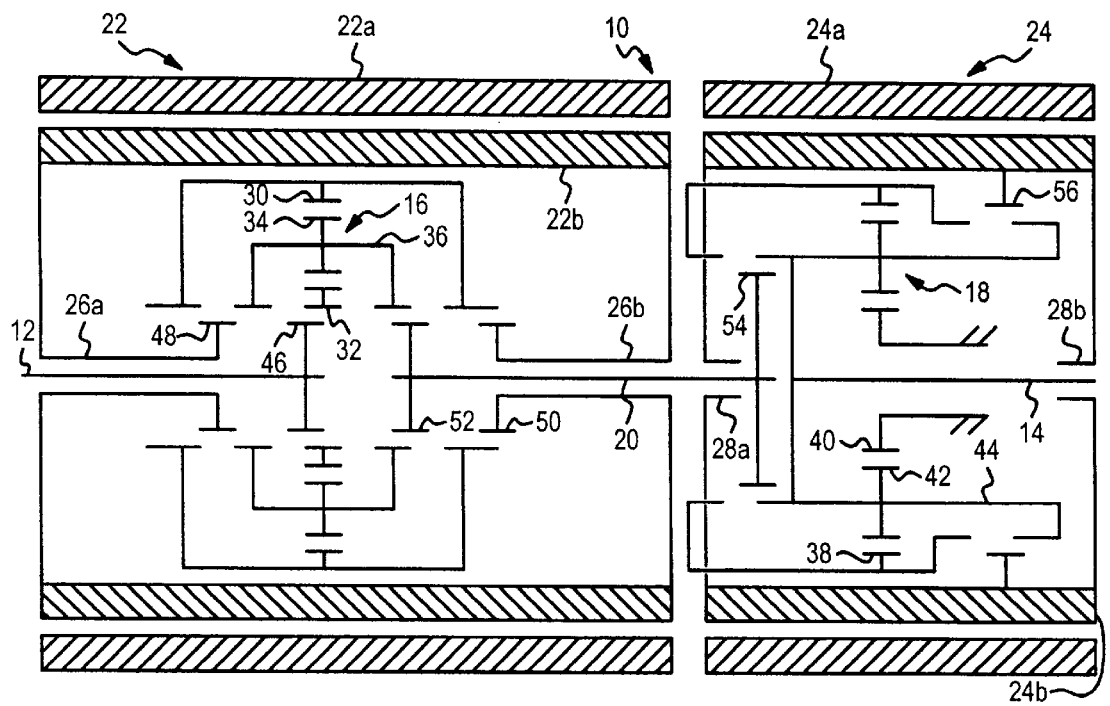
FIGS. 1A, 1B, 1C, 1D, 1E and 1F are schematic representations of an EVT embodying the concepts of the present invention, and illustrating various possible EVT operating modes.

Referring to FIG. 1, the reference numeral 10 generally designates an embodiment of a motor vehicle electrically variable ratio transmission (EVT) according to this invention. The EVT 10 has an input shaft 12 that is preferably driven by an internal combustion engine, either directly or via an input clutch. The engine may take a variety of different forms and, in a typical hybrid powertrain, drives input shaft 12 at a constant speed during forward vehicle motion subsequent to a vehicle launch phase. An output shaft 14 of EVT 10 may be coupled to vehicle drive wheels through a conventional differential gearset (not shown).

The EVT 10 includes first and second planetary gearsets 16, 18 serially coupled by a connecting shaft 20, and two electric machines 22, 24, with machines 22, 24 being coaxially aligned with the gearsets 16, 18 as shown. The machines 22, 24 are operable in either motoring or generating modes, and preferably are configured as induction machines, although other configurations are possible. The machine 22 includes a wound stator 22a and a rotor 22b, and machine 24 includes a wound stator 24a and a rotor 24b. The rotor 22a is mounted for rotation on sleeve shafts 26a, 26b, and the rotor 24a is mounted for rotation on sleeve shafts 28a, 28b.

In customary fashion, each planetary gearset 16, 18 includes an outer (ring) gear circumscribing an inner (sun) gear, and a plurality of planet gears rotatably mounted on a carrier such that each planet gears meshingly engage both the outer gear and the inner gear. Thus, the gearset 16 includes a ring gear 30, a sun gear 32, and a set of planet gears 34 mounted on a carrier 36; the gearset 18 includes a ring gear 38, a sun gear 40, and a set of planet gears 42 mounted on a carrier 44.

Figure 1B:
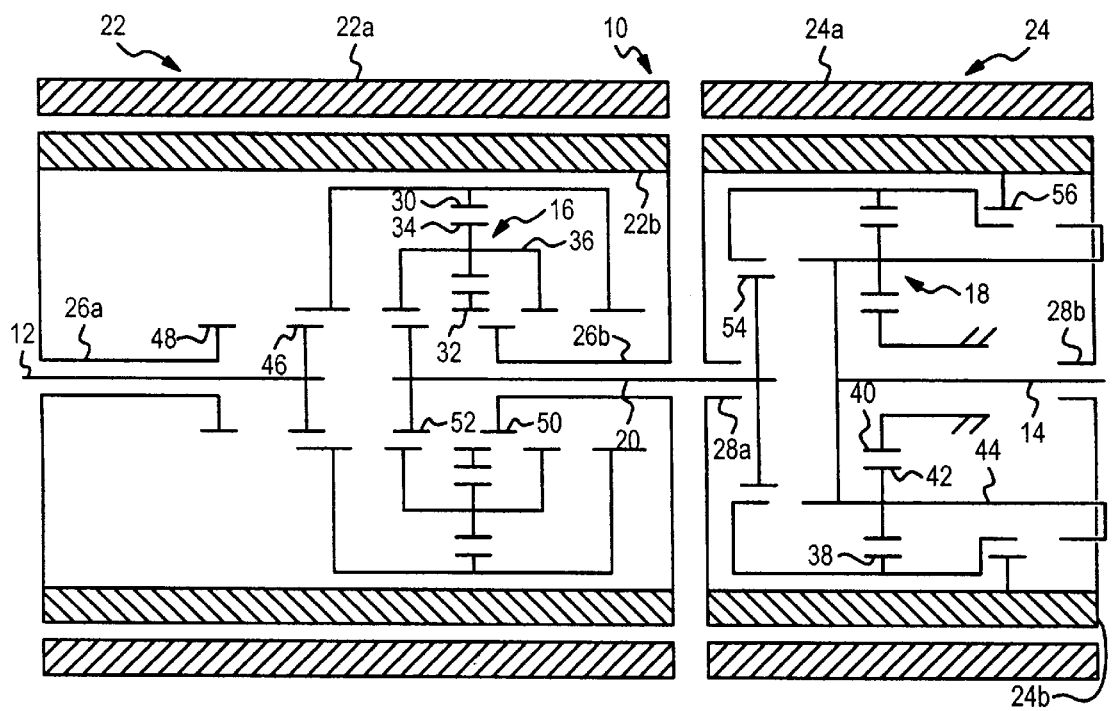
Figure 1C:
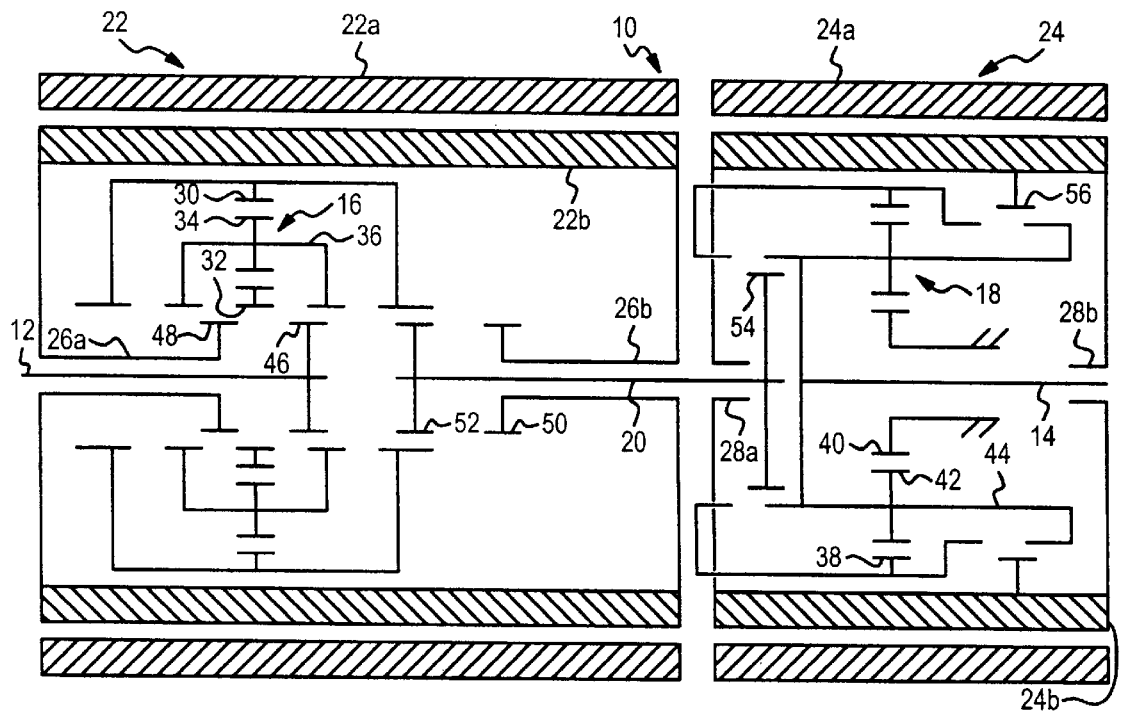
Figure 1D:
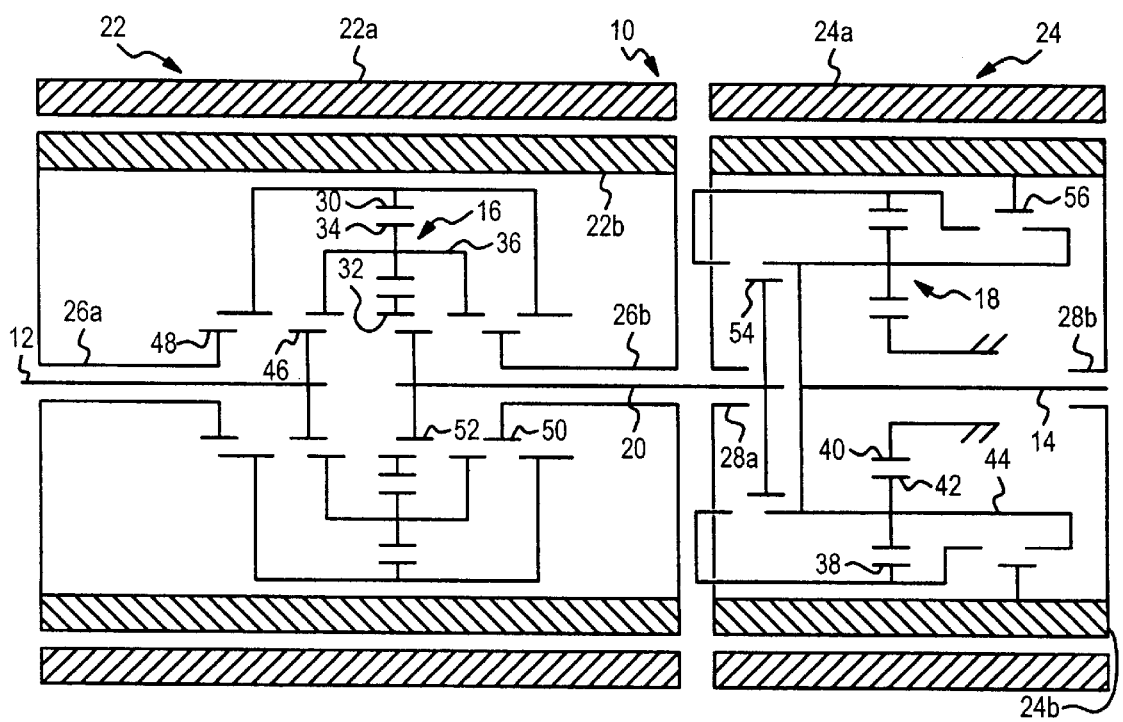
Figure 1E:
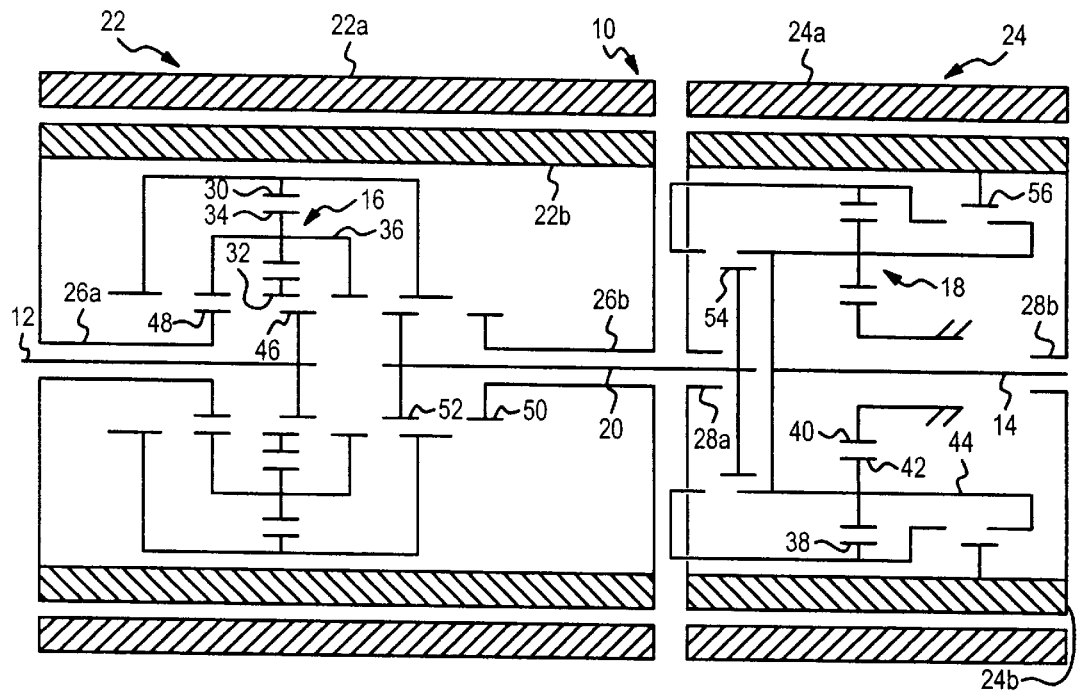
Figure 1F:
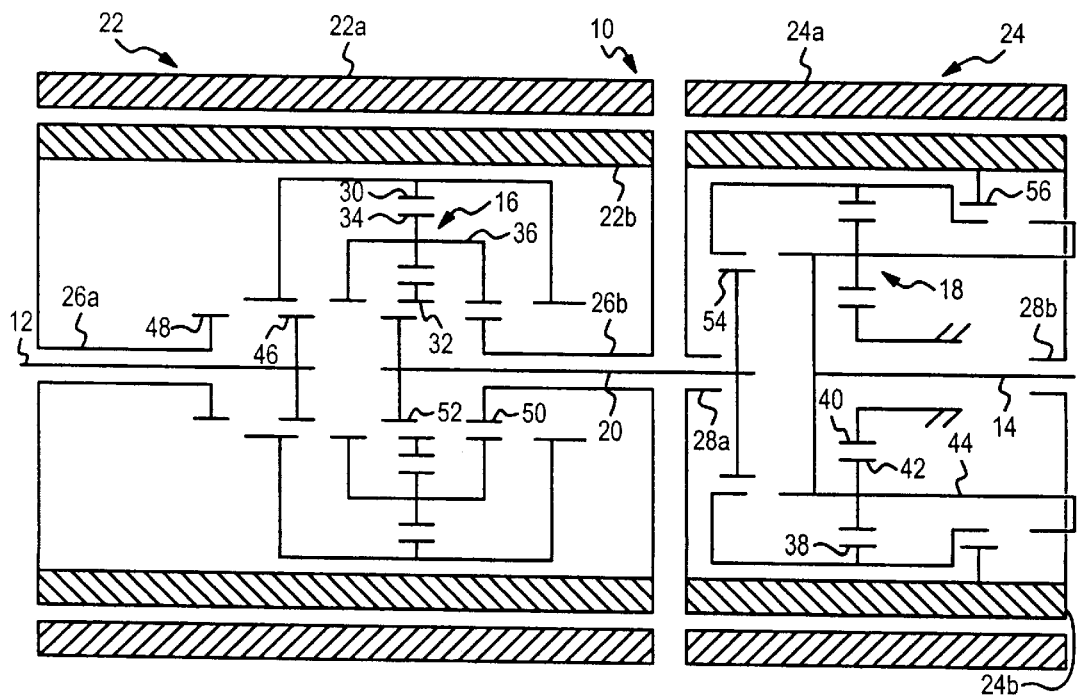

The sun, carrier and ring gears 32, 36, 30 of gearset 16 are reconfigurably coupled to input shaft 12, rotor 22b, and connecting shaft 20 by an automated manual transmission (AMT) gearing arrangement in which the gearset 16 is axially shiftable with respect to axially fixed splines 46, 48, 50, 52 respectively coupled to input shaft 12, sleeve shafts 26a, 26b, and connecting shaft 20 to establish a desired configuration. FIGS. 1A–1F depict six different configurations, including four forward configurations, and two reverse configurations, each of which provides an input split between connecting shaft 20 and rotor 22b. FIG. 1A depicts a first configuration of gearset 16 in which input shaft 12 is coupled to sun gear 32, connecting shaft 20 is coupled to carrier 36, and rotor 22b is coupled to ring gear 30 via sleeve shaft 26b, establishing a maximum forward speed reduction of connecting shaft 20 with respect to input shaft 12. FIG. 1B depicts a second configuration in which input shaft 12 is coupled to ring gear 30, connecting shaft 20 is coupled to carrier 36, and rotor 22b is coupled to sun gear 32 via sleeve shaft 26b, establishing a minimum forward speed reduction of connecting shaft 20 with respect to input shaft 12. FIG. 1C depicts a third configuration in which input shaft 12 is coupled to carrier 36, connecting shaft 20 is coupled to ring gear 30, and rotor 22b is coupled to sun gear 32 via sleeve shaft 26a, establishing a minimum forward overdrive of connecting shaft 20 with respect to input shaft 12. FIG. 1D depicts a fourth configuration in which input shaft 12 is coupled to carrier 36, connecting shaft 20 is coupled to sun gear 32, and rotor 22b is coupled to ring gear 30 via sleeve shaft 26a, establishing a maximum forward overdrive of connecting shaft 20 with respect to input shaft 12. FIG. 1E depicts a fifth configuration in which input shaft 12 is coupled to sun gear 32, connecting shaft 20 is coupled to ring gear 30, and rotor 22b is coupled to carrier 36 via sleeve shaft 26a, establishing a minimum reverse speed reduction of connecting shaft 20 with respect to input shaft 12. Finally, FIG.1F depicts a sixth configuration in which input shaft 12 is coupled to ring gear 30, connecting shaft 20 is coupled to sun gear 32, and rotor 22b is coupled to carrier 36 via sleeve shaft 26b, establishing a reverse overdrive of connecting shaft 20 with respect to input shaft 12. In each configuration, of course, operating machine 22 to vary the speed of rotor 22b electrically controls the actual ratio between input shaft 12 and connecting shaft 20, and the "mechanical point" of the configuration is defined as the ratio in effect when the speed of rotor 22b is zero.

The second planetary gearset 18 reconfigurably couples the connecting shaft 20 with output shaft 14. Output shaft 14 is coupled to carrier 44, and the sun gear 40 is grounded, as shown. The carrier and ring gear 44, 38 are reconfigurably coupled to connecting shaft 20 by an automated manual transmission (AMT) gearing arrangement in which the gearset 18 is axially shiftable with respect to axially fixed splines 54 coupled to connecting shaft 20 to establish a desired configuration. FIGS. 1A, 1C, 1D and 1E depict a first configuration in which connecting shaft 20 is coupled to carrier 44 (which is also connected to output shaft 14), establishing a forward direct or 1:1 drive between connecting shaft 20 and output shaft 14. FIGS. 1B and 1F depict a second configuration in which connecting shaft 20 is coupled to ring rear 38, establishing a fixed speed reduction of output shaft 14 with respect to connecting shaft 20.

The rotor 24b of machine 24 is reconfigurably coupled to carrier and ring gear 44, 38 of gearset 18 by an AMT gearing arrangement in which a spline 56 coupled to the inner periphery of rotor 24b is shifted axially with respect to gearset 18 to establish the desired configuration. FIGS. 1A, 1C, 1D and 1E depict a configuration in which rotor 24b is coupled to ring gear 38, allowing machine 24 to drive output shaft 14 at a reduced speed with respect to the speed of rotor 24b. FIGS. 1B and 1F depicts a configuration in which rotor 24b is coupled to directly carrier 36 and output shaft 14.

The AMT gearing arrangements coupling connecting shaft 20 to input shaft 12 and output shaft 14 are independently reconfigured to multiply the number of mechanical points between input shaft 12 and output shaft 14. In the illustrated embodiment where the gearset 16 can be configured to establish four different forward input-split ratios and two different input-split reverse ratios, and gearset 18 can be configured to establish two different forward ratios, the EVT 10 is capable of providing twelve different speed ratios: eight forward and four reverse. The coupling between machine 24 and gearset 18 is capable of independent configuration as well, but is preferably reconfigured during zero torque operation of machine 24. In a preferred implementation, the machine 24 is operated primarily in a motoring mode to assist the engine and to supply torque to output shaft 14 during reconfiguration (shifting) of the gearsets 16 and 18, and machine 22 is operated alternately in a generating mode to develop electrical power for satisfying the energy requirements of machine 24 and in a motoring mode supplied by machine 24. If no electrical power source is available, the zero torque points of machine 24 occur at the mechanical points of gearset 16 when the machine 22 is unable to generate power for energizing the machine 24. On the other hand, if an external source of electrical energy is available for supplying power to machine 24, the zero torque points need not coincide with the mechanical points of gearset 16, and instead occur when the power required by machine 22 is equal to the power that can be supplied by the external source.

Figure 2:
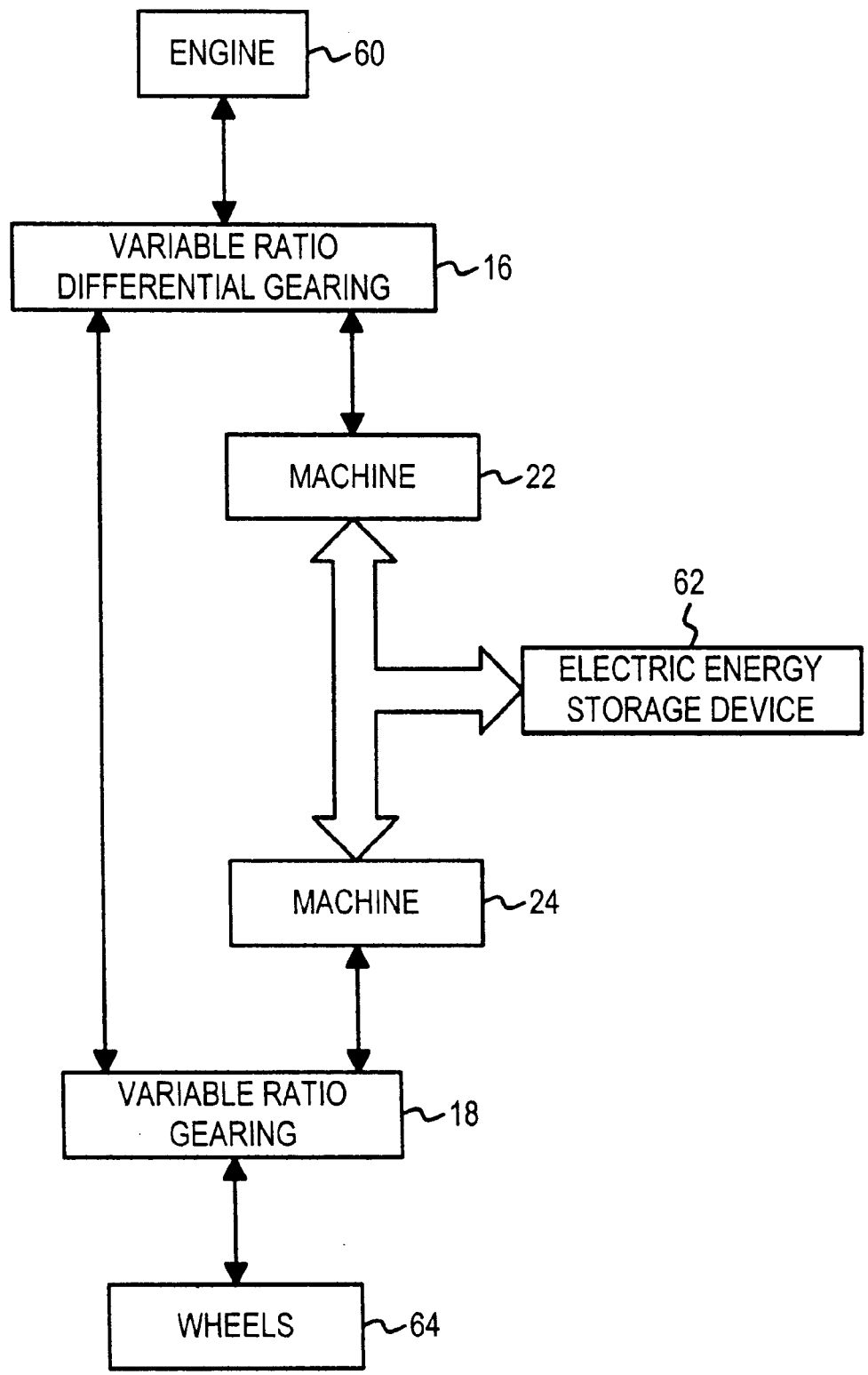
FIG. 2 is a diagram illustrating the EVT of this invention as applied to a hybrid electric vehicle powertrain.

The block diagram of FIG. 2 depicts the EVT 10 in the context of a hybrid electric vehicle powertrain. The gearset 16 is identified as variable ratio differential gearing, with the machine 22 controlling the ratio, and the gearset 18 is identified as variable (shiftable) ratio gearing. As explained above, an engine 60 (input) is coupled to the wheels 64 (output) through gearsets 16 and 18, and machine 24 is also coupled to the wheels 64 through gearset 18. Alternatively, of course, the machine 24 may be coupled to the wheels 64 (either the same wheels or different wheels) through another gearset packaged integral or remote from gearset 18. Finally, both machines 22 and 24 are electrically coupled to an electric energy storage device 62, which is capable of both supplying electrical power to machines 22, 24 and absorbing electrical power generated by machines 22, 24.

Figure 3:
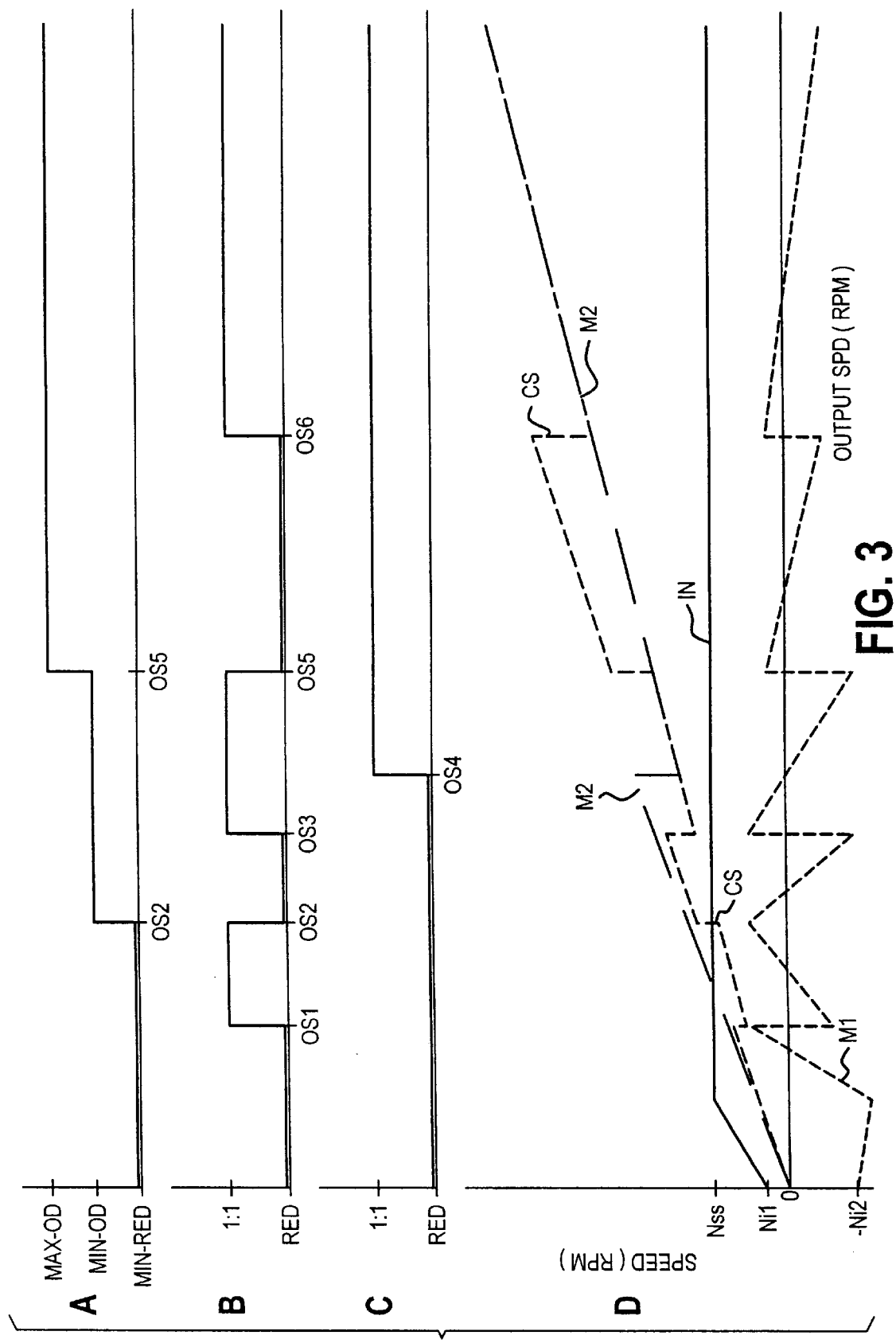
FIG. 3, Graphs A–D, depict a representative operation of the EVT of FIG. 1. Graphs A, B and C depict various operating modes of the EVT relative to the output speed, and Graph D depicts various EVT shaft speeds relative to the output speed.

Graphs A–D of FIG. 3 depict full power forward operation of EVT 10, with no external source of electrical power, in a six-speed implementation utilizing three forward configurations of the gearset 16 and the two configurations of the gearset 18, and selective configuration of the machine 24. The three forward configurations of the gearset 16 include the minimum speed reduction arrangement (MIN-RED) depicted in FIG. 1B, the minimum overdrive arrangement (MIN-OD) depicted in FIG. 1C and the maximum overdrive arrangement (MAX-OD) depicted in FIG. 1D, and the selected configuration is depicted in Graph A as a function of output shaft speed. Graph B likewise depicts the selected configuration —reduction (RED) or 1:1— of gearset 18, and Graph C depicts the selected configuration —reduction (RED) or 1:1— of machine 24, both as a function of output shaft speed. Graph D depicts the input shaft speed (IN), and the corresponding speeds of rotor 22b (M1), rotor 24b (M2), and connecting shaft 22 (CS).

At low forward output speeds, the gearset 16 is configured in the MIN-RED mode, the gearset 18 is configured in the RED mode, and the rotor 24b is coupled to ring gear 38 (RED mode), as respectively indicated in Graphs A, B and C. At zero output speed, the connecting shaft 20 is held stationary, and an engine drives input shaft 12 at an idle speed Ni1; in this state, input shaft 12 drives rotor 22b in reverse at an idle speed of −Ni2. To launch the vehicle, the engine 60 progressively increases the input speed IN to a steady-state running speed Nss; the machine 22 (M1) is operated in a generator mode, and the developed power is used to drive machine 24 (M2) in the motoring mode to assist the engine 60. Once the input speed IN reaches Nss, the speed of machine 22 (M1) is reduced to zero and then increased in a positive direction as shown to further increase the speed of connecting shaft 20 (CS). At output speed OS1, the gearset 18 is reconfigured in the direct or 1:1 mode, which requires the connecting shaft 20 to decrease to the output speed, which in turn, drives the rotor 22b of machine 22 in a negative direction. From this point, the speed of machine 22 (M1) is reduced to zero and then increased in a positive direction as shown to further increase the speed of connecting shaft 20 (CS). At output speed OS2, the gearset 16 is reconfigured to the MIN-OD mode, and the gearset 18 is reconfigured to the RED mode; both reconfigurations require an increase in the speed of connecting shaft 20, and the speed of machine 22 is not affected. At such point, the speed of machine 22 (M1) is reduced to zero and then increased in a negative direction as shown to further increase the speed of connecting shaft 20 (CS). At output speed OS3, the gearset 18 is reconfigured in the direct or 1:1 mode, which requires the connecting shaft 20 to decrease to the output speed, which in turn, drives the rotor 22b of machine 22 in a positive direction as shown. The speed of machine 22 (M1) is then reduced to zero and increased in a positive direction to further increase the speed of connecting shaft 20 (CS). At output speed OS4 when the speed of machine 22 is zero (i.e., at the mechanical point of gearset 16) the machine 24 is reconfigured to the direct or 1:1 mode in which rotor 24b is coupled directly to the carrier 44 and output shaft 14; this requires the speed of rotor 24b to decrease to the output speed as shown. At output speed OS5, the gearset 16 is reconfigured to the MAX-OD mode, and the gearset 18 is reconfigured to the RED mode; this requires the speed of connecting shaft to increase to the speed of ring gear 38, which drives rotor 22b in a positive direction as shown. At such point, the speed of machine 22 (M1) is reduced to zero and then increased in a negative direction as shown to further increase the speed of connecting shaft 20 (CS). Finally, at output speed OS6, the gearset 18 is reconfigured in the direct or 1:1 mode, which requires the connecting shaft 20 to decrease to the output speed, which in turn, drives the rotor 22b of machine 22 in a positive direction. Thereafter, the speed of machine 22 (M1) is reduced to zero and then increased in a negative direction as shown to further increase the speed of connecting shaft 20 (CS).

In the above illustration, the machine 22 is operated alternately in the generating mode, and the generated electrical power is used to operate machine 24 in the motoring mode, and in the motoring mode with electrical power from machine 24 in the generating mode. Accordingly, no power is supplied to machine 24 at the mechanical points of the gearset 16 (i.e., at the zero speed points of machine 22), and the coupling of machine 24 to gearset 18 is reconfigured at such a point to minimize shift energy.

In summary, the present invention provides an improved input-split EVT configuration including first and second independently reconfigurable multiple-mode gearsets 16, 18 serially coupled by connector shaft 20, and featuring automated manual transmission (AMT) gearing for reduced cost, size and complexity. The capability of independently reconfiguring the gearsets 16, 18 and machine 24 with AMT gearing multiplies the number of overall transmission operating modes to provide improved efficiency without significantly increasing the cost, size and complexity of the EVT, and without sacrificing the advantages of known EVT configurations, such as elimination of an input clutch.

While the present invention has been described in reference to the illustrated embodiment, it is fully expected that various modifications in addition to those mentioned above will occur to those skilled in the art. For example, while the operation of EVT 10 has been illustrated in the context of vehicle acceleration, it will be apparent that the EVT 10 (and engine 60) may also be used to assist vehicle braking, with the machines 22, 24 being operated as generators to apply reverse torque to the wheels 64, and supplying electrical power to energy storage device 62 in the process. Also, common bevel differential gears or straight differential gearing may be used in place of the planetary gearset 16, and different planetary configurations are also possible. Thus, it will be understood that electrically variable transmissions incorporating these and other modifications may fall within the scope of this invention, which is defined by the appended claims.

What is claimed is:

1. An electrically variable transmission coupling a rotary input to a rotary output, comprising in combination:

differential gearing connecting said input, said output, and a first electric machine; a second electric machine selectively coupled to said output at two or more mechanical ratios, wherein a shift between said ratios is accomplished while power is supplied to the output through said differential gearing and a torque produced by the second electric machine is substantially zero; and wherein the second electric machine and the differential gearing are each selectively and independently coupled to the output at two or more ratios.

2. The electrically variable transmission of claim 1, wherein the shift between mechanical ratios connecting the input, the output and the second electric machine is accomplished when a speed of the first electric machine is substantially zero.

3. The electrically variable transmission of claim 1, wherein the differential gearing consists of a planetary gearset having sun gear, ring gear, and planet carrier members selectively coupled in two or more differential configurations to the input, the output and the first electric machine.

4. The electrically variable transmission of claim 3, wherein the sun gear, ring gear, and planet carrier members of said planetary gearset are coupled to the input, the output and the first electric machine in a selected one of the following combinations: (1) planet carrier member to input, sun gear member to first electric machine, ring gear member to output; (2) ring gear member to input, sun gear member to first electric machine, planet carrier member to output; and (3) planet carrier member to input, ring gear member to first electric machine, sun gear member to output.

5. A hybrid electric vehicle powertrain including an engine, wheels, and an electrical storage device, comprising:
   differential gearing connected to the engine, the wheels and a first electric machine; and
   a second electric machine connected to the wheels at two or more mechanical ratios, wherein shifting between said mechanical ratios is accomplished at a zero torque point when the engine is supplying power to the wheels and an electrical power available to the second electric machine from a combination of the first electric machine and the electric storage device is substantially zero.

6. A hybrid electric vehicle powertrain including an engine, wheels, and an electrical storage device, comprising:
   differential gearing connected to the engine, the wheels and a first electric machine, wherein the differential gearing includes a planetary gearset having members selectively coupled in two or more differential configurations to the engine, the wheels and the first electric machine; and
   a second electric machine connected to the wheels at two or more mechanical ratios, wherein shifting between said mechanical ratios is accomplished when the engine is supplying power to the wheels and an electrical power available to the second electric machine from a combination of the first electric machine and the electric storage device is substantially zero.

7. The hybrid electric vehicle powertrain of claim 6, wherein said electric storage device supplies power to the second electric machine to maintain a power path to the wheels during reconfiguration of the differential gearing.

8. The hybrid electric vehicle powertrain of claim 7, wherein the second electric machine and the differential gearing are each selectively and independently coupled to the wheels at two or more ratios through one or more common gear members.

* * * * *